United States Patent
Lammers

(10) Patent No.: US 7,158,369 B2
(45) Date of Patent: Jan. 2, 2007

(54) SINGLE PHASE OR POLYPHASE SWITCHGEAR IN AN ENVELOPING HOUSING

(75) Inventor: Arend Jan Willem Lammers, Hengelo (NL)

(73) Assignee: Holec Holland N.V., Hengelo (NL)

( * ) Notice: Subject to any disclaimer, the term of this patent is extended or adjusted under 35 U.S.C. 154(b) by 293 days.

(21) Appl. No.: 10/474,372

(22) PCT Filed: Apr. 9, 2002

(86) PCT No.: PCT/NL02/00227

§ 371 (c)(1),
(2), (4) Date: Mar. 10, 2004

(87) PCT Pub. No.: WO02/082606

PCT Pub. Date: Oct. 17, 2002

(65) Prior Publication Data

US 2004/0130858 A1      Jul. 8, 2004

(30) Foreign Application Priority Data

Apr. 9, 2001    (NL)    .................................... 1017797

(51) Int. Cl.
*H02B 13/035*    (2006.01)
*H02B 5/06*    (2006.01)
*H02B 7/01*    (2006.01)
*H05K 5/04*    (2006.01)

(52) U.S. Cl. ...................... 361/604; 361/612; 361/618; 174/17 GF

(58) Field of Classification Search ................ 361/605, 361/604, 612, 618; 174/17 GF; 218/13
See application file for complete search history.

(56) References Cited

U.S. PATENT DOCUMENTS

| | | | | |
|---|---|---|---|---|
| 2,425,250 A | * | 8/1947 | Lamb ......................... | 250/239 |
| 3,619,726 A | * | 11/1971 | Boersma ...................... | 361/612 |
| 4,211,542 A | * | 7/1980 | Kramer ........................ | 96/128 |

FOREIGN PATENT DOCUMENTS

| | | |
|---|---|---|
| DE | 27 02 763 | 7/1978 |
| EP | 0 393 733 A1 | 10/1990 |
| EP | 1 054 493 | 11/2000 |

* cited by examiner

*Primary Examiner*—Anatoly Vortman
(74) *Attorney, Agent, or Firm*—Young & Thompson

(57) ABSTRACT

Single phase or polyphase switchgear having one or more switches which are mounted with the aid of solid insulation such that they are insulated, as well as associated live components such as rail systems, connectors and the like. Both the switches and the associated live components are housed in a housing enveloping the switches and live components. The enveloping housing is filled with air having a low moisture content and the interior space thereof is sealed with respect to the exterior space around the enveloping housing in such a way that the air present in the housing is not contaminated and will not reach the dew point.

11 Claims, 1 Drawing Sheet

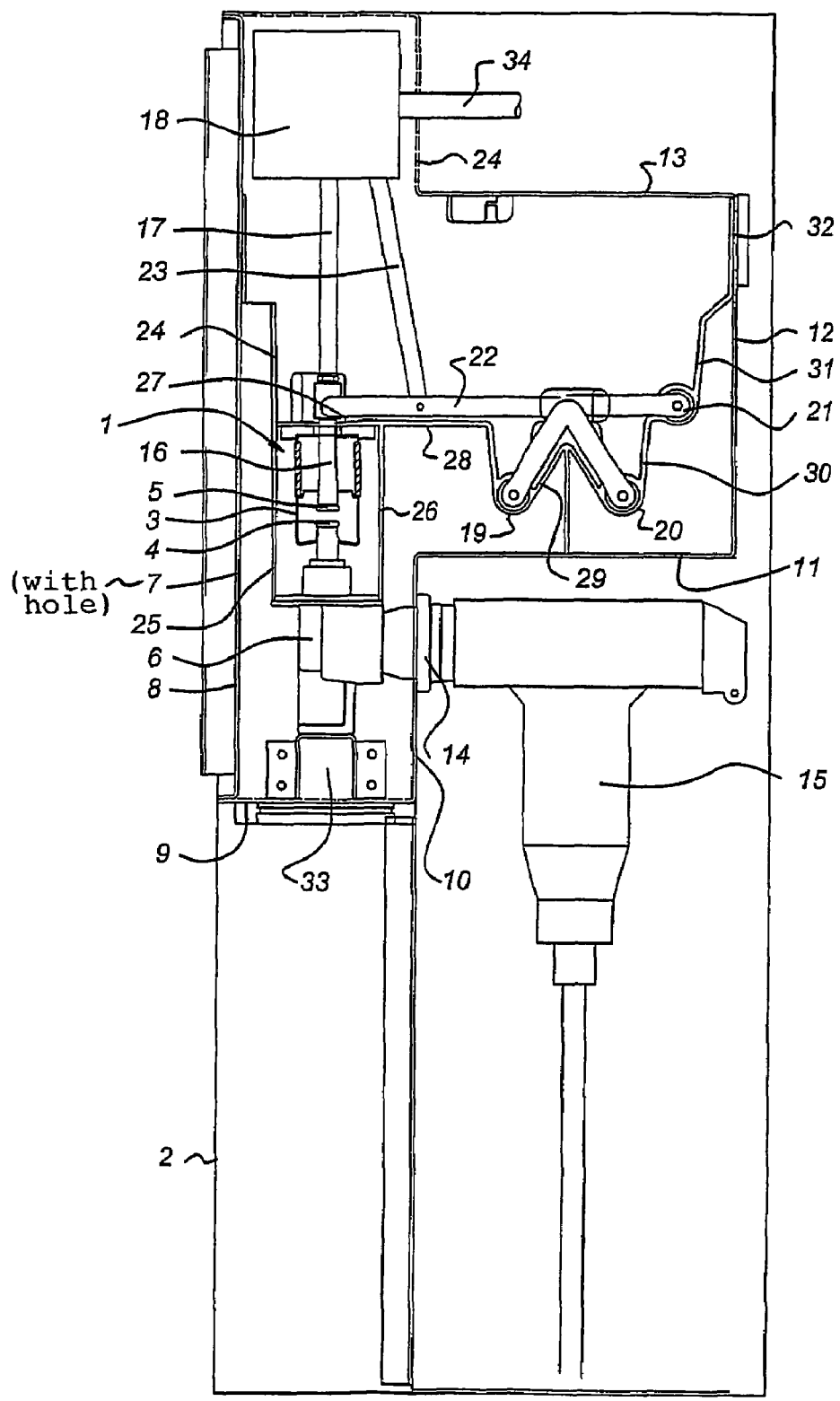

SINGLE PHASE OR POLYPHASE SWITCHGEAR IN AN ENVELOPING HOUSING

BACKGROUND OF THE INVENTION

The invention relates to a single phase or polyphase switchgear comprising one or more switches which are mounted with the aid of solid insulation such that they are insulated, as well as associated live components such as rail systems, connectors and the like, wherein both the switches and the associated live components are housed in a housing enveloping said switches and live components.

DESCRIPTION OF THE RELATED ART

Switchgear of this type is disclosed in European Patent Application EP 0 393 733 A1. This known switchgear has the advantage that a reliable, stable housing that is safe to touch is obtained with a relatively simple and lightweight housing construction.

It is also generally known, as can be seen from the article entitled "Mittelspannugs-Anlagen und Stationen, die neue Lastschaltergeneration unter Einsatz von $SF_6$ als Isolier-und Löschmittel" by Karl-Heinz Siebel, Wegberg, published in Elektrizitätswirtschaft, volume 79 (1980), No. 22, that various environmental conditions (mainly dust and humidity) can have an adverse effect in the long term on the operational reliability of such switches insulated with air and a solid.

As a result of the increasing shortage of space, switchgear that is insulated entirely with air is being considered to an increasingly lesser extent because of its relatively large dimensions. The switchgear of more compact construction with which use is made of solid insulation or solid/air insulation has also become less attractive because of the increased cost of land.

In view of the above, nowadays sulphur hexafluoride ($SF_6$) is commonly used as insulating agent and sometimes also as extinguishing agent in the chamber in which the switchgear is housed. This gas was chosen on the basis of various advantageous properties of this gas, such as the high dielectric strength, the good cooling properties and the slowness of its reaction. A reduction in the dimensions of the switchgear, compared with the switchgear mentioned above, can be achieved by this means for the same performance (for example the voltage and current values).

Although it has not yet been established that $SF_6$ is toxic per se, it has been found that decomposition products of $SF_6$, such as $SF_4$, $S_2F_4$, $S_2F_{10}$, $SOF_2$, $SO_2F_2$, HF and $SO_2$ are highly toxic. In addition, $SF_6$ is one of the six gases specifically cited during the World Environmental Conference in Kyoto which are to a great extent responsible for the greenhouse effect. On these grounds it is extremely important to avoid the use of $SF_6$ where possible.

The $SF_6$ used up to now also has the disadvantage that filling of the switchgear with this gas has to be carried out in such a way that the air present in the switchgear has to be completely removed therefrom. In addition, the enclosure in which the switchgear is housed has to be of completely gastight construction in order to prevent leakage of gas to the outside as well as the penetration of outdoor air. In order to be able to guarantee that the interior space remains completely filled with the $SF_6$ gas, some overpressure of the gas is used, despite said hermetic sealing, in order to be able to compensate in the longer term for minimal leaks, which cannot always be avoided with the constructions used in practice. Furthermore, a manometer is often also installed to monitor the pressure of the said gas in the switchgear.

The consequence of an electric arc occurring internally is as a rule that the $SF_6$ gas is liberated with its decomposition products, as a result of which the switchgear concerned cannot be approached without extensive personal protection equipment. Following such a malfunction the switchgear is usually no longer usable, but even if the switchgear can be repaired, complete re-evacuation followed by refilling with $SF_6$ will have to be carried out at the very least. The same operations have to be carried out in the event of other malfunctions caused by components inside the enclosure and during maintenance work on the installation, for example in the case of preventive replacement of $SF_6$ contaminated by moisture and/or otherwise.

The article entitled "$SF_6$-ein Umweltproblem?" by Horst Peter and Rolf Sartorius, published in Elektrizitätswirtschaft, Volume 95 (1996), No. 8, pp. 512–514, states that even in 1996 there is still no good replacement for $SF_6$ and one was resigned to the disadvantages associated with the use of $SF_6$, on condition that recycling of the $SF_6$ gas must take place as far as possible and that when sufficient space is available air is to be preferred as the dielectric.

SUMMARY OF THE INVENTION

The aim of the invention is to provide switchgear of the type mentioned in the preamble, with which, whilst retaining the advantages of the type of switchgear mentioned, the compactness of $SF_6$ switchgear is matched and the above-mentioned disadvantages associated with $SF_6$ are avoided.

Said aim is achieved according to the invention in that the enveloping housing is filled with air having a low moisture content and seals the interior space thereof with with respect to the exterior space around the enveloping housing in such a way that the air present in the housing is not contaminated and will not reach the dew point.

Because it is ensured in this way that the formation of condensation is not able to occur in the customary operating temperature range and thus the electrically insulating properties of air having a low moisture content remain constant during the life of the switchgear and also cannot be affected by dust, it is possible to construct inexpensive and compact switchgear in the medium-voltage or high voltage range as well. The humidity can be monitored using a simple and inexpensive hygrometer and as soon as the humidity of the air in the enveloping housing is too high, for example as a result of possible small leakages, it is necessary merely to remove the moisture from the air in the conventional manner and by the use of simple, inexpensive means. The hygrometer can be arranged in the enveloping housing such that it is visible through a window in the latter. A colour hygrometer, that indicates the various moisture levels by means of colours, is, for example, a usable and clear indicator.

What is achieved by means of the said sealing is that atmospheric conditions that have an adverse effect on switching installations, such as atmospheric humidity, temperature and dust, are not able to exert an adverse effect.

It is also pointed out that the dew point must not be reached even at the lowest operating temperature.

In order also to be able to use the invention in those cases where the requirements imposed in respect of the hermetic sealing of the enveloping housing are not as stringent as in the case of the use of $SF_6$ gas and in order to avoid the need for continuous monitoring of the humidity and for any measures having to be taken for the extraction of moisture, the invention also provides switchgear with which a moisture-absorbent agent is arranged in the enveloping housing, the quantity of said moisture-absorbent agent being such that the moisture that penetrates as a result of leakage of the enveloping housing is completely absorbed during the life of the switchgear.

In the case of switchgear according to the invention it is no longer necessary to evacuate the entire switchgear either during manufacture of the switchgear or after a fault has occurred or after overhaul. All that is necessary is to ensure that the moisture is extracted from the air present.

In a further development of the invention insulating barriers, for example in the form of insulating partitions or an insulating layer over the switch housing, are arranged between the live components of the various phases of the switchgear inside the enveloping housing.

As a result of the use of clean air with a low moisture content no contamination and no condensation will occur, so that merely an inexpensive, commercially available plastic is adequate for the partitions or insulating layer.

The fact that condensation and contamination by atmospheric effects no longer arise has a beneficial effect on the electric field strength distribution due to the live components which arises at the insulating partitions, as a result of which a compact construction is possible and the current requirements for switchgear in respect of the ability to withstand test voltages and surge voltages are also met.

It is pointed out that it is known from EP 0 393 733 A1 to encapsulate the switch; however, as well as for insulation this encapsulation is also used to support the switches in the metal housing and for this reason the encapsulation is of heavyweight construction. Moreover, with this arrangement the known switch is not as compact as the switch according to the invention, where the encapsulation has been replaced by the inexpensive partitions.

In a further embodiment of the invention the insulation barriers are also used for the mechanical fixing and positioning of various live components of the phases in the enveloping housing.

The measures taken in order to obtain compact switchgear are directed in particular at the live components of the switchgear. As has been pointed out in the article entitled "Reliability improvements in the operating mechanism and control circuit of the gas-insulated switchgear" by M. Tsutsumi, T. Fuji and Y. Tobiyami, published in *Fuji Electric Review*, vol. 40, no. 2, pp. 46–51, 1994, the drive mechanism in switchgear however also frequently gives rise to faults. In the case of $SF_6$ switching installations the drive mechanism is therefore usually also positioned outside the enclosure filled with $SF_6$. As a result of this measure it is not necessary to empty the enclosure and refill it with $SF_6$, with all the associated disadvantages described above, each time the drive mechanism is repaired or maintenance is carried out.

It can be seen from the article mentioned above that these faults in the drive mechanism are usually caused by atmospheric influences which give rise to corrosion and contamination of moving parts.

In order to improve this, according to a further development of the invention the drive mechanism is also housed in the same enclosure that provides a seal against the exterior space and contains air having a low moisture content.

The invention will be explained in more detail below with reference to the drawing.

In the drawing one embodiment of the switchgear according to the invention is shown in section through a switch.

The switchgear according to the invention can serve for switching a connection between a main conductor and a branch conductor. This main conductor is, for example, a medium-voltage conductor carrying a voltage of 12 kV.

The switching component, as part of a load breaker switch or power switch, can be, for example, a vacuum circuit breaker. The switching component is housed, with the associated live components, in an enveloping housing. This enveloping housing is filled with air having a low moisture content and the interior space of this housing is sealed with respect to the exterior space in such a way that no atmospheric influences take place and that, under the worst conditions and throughout the entire life of the switchgear, the air present in the housing is not contaminated and is not able to reach the dew point. Preferably, a moisture-absorbent agent is therefore placed in the enveloping housing, the quantity of which moisture-absorbent agent is such that the moisture that penetrates as a consequence of leakage of the enveloping housing is completely absorbed during the life of the switchgear.

It has been found that, in comparison with the switchgear known to date and filled with $SF_6$ gas, as a result of the use of the air having a low moisture content good insulation can be achieved for higher voltages and consequently switchgear of relatively small dimensions can also be designed.

As a result of the use of insulation barriers around the live components in the enveloping housing the size of the switchgear can be even further reduced whilst maintaining the power performance and meeting requirements such as the ability to withstand surge voltages and flash-over, even if the encapsulation consisting of solid insulating material known from the state of the art is omitted.

BRIEF DESCRIPTION OF THE DRAWING

The sole drawing FIGURE illustrates the invention.

DESCRIPTION OF THE PREFERRED EMBODIMENTS

A section of a possible embodiment of switchgear according to the invention is illustrated in the drawing. What is concerned here is a three-phase embodiment and only one switch, a vacuum circuit breaker, of one phase can be seen in the section. This vacuum circuit breaker 1 is housed, with other components of the switchgear, in an equipment housing or cabinet 2. The vacuum circuit breaker 1 consists of a vacuum tube (3) in which a fixed switch contact 4 and a switch contact 5 that can be moved away from and towards the contact 4 are housed. The vacuum circuit breaker 1 is supported by means of the casting 6 in an enveloping housing 7 that is sealed as well as possible and preferably is made of metal. This enveloping housing 7 has walls 8, 9, 10, 11, 12 and 13. The fixed switch contact 4 is linked to the outside in a gastight manner, for the cable connection 15, by means of the casting 14.

The movable switch contact 5 is fixed on a contact rod 16 that can be operated by means of the drive rod 17. This drive rod 17 is, in turn, coupled to a drive mechanism 18, that is indicated diagrammatically as a block. A rail system with the rails 19–21 is also housed in the enveloping housing 7. Between the rail system and the movable switch contact 5 of the vacuum switch 1 there is a change-over switch 22 that, via the change-over drive rod 23, can also be operated by the drive mechanism 18.

The sealed enveloping housing 7 is filled with air having a low moisture content and it is important that the air having a low moisture content may not reach the dew point. To this end the sealing of the enveloping housing 7 must be such that the dew point of the air having a low moisture content may not be reached under the worst environmental conditions.

For example, the air having a low moisture content contains at most that amount of moisture that is present in air having a relative humidity of 95% at a temperature that corresponds to the minimum operating temperature to be expected.

Assuming a minimum operating temperature of $-20°$ C., the above means that the air present in the interior space may contain about 0.8 gram water per $m^3$ by volume. According to generally accepted and known tables, with this amount of water the dew point will be reached at $-21°$ C. The operating temperature at which the switching installation is usually operated is much higher and thus it is therefore also guaranteed that the dew point will not be reached in the interior space at temperatures above $-20°$ C., or no condensation will occur in the interior space.

In practice, however, it is found that an enclosure cannot be completely sealed and that, especially in the long term as a result of various differences in temperature, pressure and voltage, a certain amount of leakage, however small, can arise via the connections with the housing.

In order to be able to compensate for the abovementioned leakage and also to be able to use the invention in those cases where it is desired that a poorer quality of the sealing of the enclosure will be able to suffice, the invention also provides for the incorporation of a moisture-absorbent agent in the interior space of the installation. The amount of moisture-absorbent agent must then be such that all the moisture that penetrates during the life of the installation is absorbed. There is thus, in particular, a relationship between life, leakage and the amount of moisture-absorbent agent. According to the invention this relationship can be expressed as follows: $D=(L \times V \times Y + I \times J) \times 100/O + S \times F \times 100/O$.

In this equation D is the amount of desiccant required in grams assuming a specific amount of leakage L per day in $m^3$. Furthermore, V is the moisture content in grams per $m^3$ of the ambient air that may penetrate at a specific temperature, Y is the expected life of the installation in days, I the capacity of the interior space in the housing in $m^3$ and J the moisture content of the air present in the interior space during manufacture, likewise in grams per $m^3$ and at a specific temperature. The absorbency of the moisture-absorbent agent is also incorporated in the expression. This is a ratio that is specified by the manufacturer and that gives the ratio between the amount by weight of incorporated water and the amount by weight of the moisture-absorbent agent. This ratio is also influenced by the relative humidity of the air immediately around the moisture-absorbent agent. The manufacturer usually provides these requisite data in the form of tables.

Since the moisture-containing material that may be present in the interior space can also have an effect on the relative humidity in said interior space, this is also taken into account in the expression according to the invention.

In the expression S indicates the amount by weight of moisture-containing material in grams and F indicates the moisture content in the material as a ratio.

A practical example gives, for example, the following specific data:
L=0.5 l/day=$5 \times 10^{-4}$ $m^3$/day
V=50.7 gram at a temperature of $40°$ C.
Y=25 years=9125 days
I=0.25 $m^3$
J=15 gram/$m^3$
O=20%
S=10 kg=10000 gram
F=0.2

From the above data it can be seen that 1275 gram absorbent is sufficient to keep the relative humidity below the dew point under the normal operating conditions for the life of the installation.

As a result of the use of a conditioned interior space, the solid insulation around the vacuum circuit breaker and the associated live components can be replaced by insulation barriers arranged in the enveloping housing 7 around the vacuum circuit breaker and the associated live parts, by means of which insulation barriers it is possible to comply with the further requirements that are imposed on this type of switching system, such as the ability to withstand surge voltages and voltage discharge between two phases, whilst retaining the compact small dimensions. In the embodiment shown in the drawing these insulation barriers are formed by a single-phase enclosure that consists of the partitions 24, 25, 26, 27, 28, 29, 30, 31, 32 made of insulating material.

It has been found that insulation barriers are not adequate with the compact dimensions such as are customary with $SF_6$ without the use of air having a low moisture content and protection against atmospheric influences, since as a result of the moisture and dust contamination flash-over can take place along the surfaces of the insulation barriers or partitions, with the associated short-circuiting problems or explosions. As a result of the use of the air having a low moisture content and protection against atmospheric influences it is possible for inexpensive insulating material to suffice for the insulation barriers.

The insulation barriers or partitions can also be used to support various components of a phase, such as the rails 19–21.

The moisture-absorbent agent for keeping the moisture content of the air in the enveloping housing low can be accommodated in a cartridge, such as the cartridge 33. The enveloping housing 7 is provided with a hole, which is not shown in the drawing, that can be closed by a cover and, after opening the cover, gives access to cartridge 33. The wall of the enveloping housing 7 provided with the hole preferably adjoins the external environment of the switchgear. The said hole can be an integral part of a weakened section of the wall of the enveloping housing 7, which section, for example, surrounds the hole. If too high a pressure builds up in the enveloping housing this portion will be blown out so that any explosion can take place in a controlled manner. This portion is preferably oriented such that when it blows out the gases liberated are not directed towards any people in the vicinity of the switchgear. For example, the weakened portion is arranged somewhere at the bottom of the rear wall.

As in the embodiment shown in the figure, the drive device 18 is likewise accommodated in the enveloping housing that contains the air having a low moisture content. Only a drive shaft 34 of the drive device 18 protrudes from the enveloping housing and is fed gastight through the associated wall of the housing.

The invention claimed is:

1. Single phase or polyphase switchgear comprising one or more switches which are mounted with the aid of solid insulation such that they are insulated, as well as associated live components such as rail systems, connectors and the like, wherein both the switches and the associated live components are housed in a housing enveloping said switches and live components, characterised in that the enveloping housing is filled with air having a low moisture content and the interior space thereof is sealed with respect to the exterior space around the enveloping housing in such a way that the air present in the housing is not contaminated and will not reach the dew point, characterised in that a moisture-absorbent agent is arranged in the enveloping housing, the quantity of said moistureabsorbent agent being such that the moisture that penetrates as a result of leakage of the enveloping housing is absorbed during the life of the switchgear, and characterised in that the amount of absorbent is determined by the equation $D=(L \times V \times Y+I \times J) \times 100/O+S \times F \times 100/O$ where D is the amount of desiccant required in grams assuming a specific amount of leakage L per day in $m^3$, V is the moisture content in grams per $m^3$ of the ambient air that may penetrate at a specific temperature, Y is the expected life of the installation in days, I the capacity of the interior space in the housing in $m^3$, J the moisture content of the air present in the interior space during manufacture in grams per $m^3$ and at a specific temperature, O is the absorbency of the moisture-absorbent agent, S is the amount by weight of the moisture-containing material in the interior space in grams and F is the moisture content of the moisture-containing material in percent.

2. Switchgear according to claim 1, characterised in that the air having a low moisture content contains at most that amount of moisture that is present in air having a relative humidity of 95% at a temperature that corresponds to the minimum operating temperature to be expected.

3. Switchgear according to claim 1, characterised in that electrical insulation barriers are arranged between the switches per phase in the enveloping housing.

4. Switchgear according to claim 3, characterised in that the electrical insulation barriers are formed by insulating partitions.

5. Switchgear according to claim 3, characterised in that the switches are provided with their own switch housings and the electrical insulation barriers also form an electrically enveloping housing completely containing the switches.

6. Switchgear according to claim 3, characterised in that the electrical insulation barriers also serve for the mechanical fixing and positioning of various live components of the phases in the enveloping housing.

7. Switchgear according to claim 1, characterised in that at least one of the walls of the enveloping housing is provided with a hole that gives access to a cartridge filled with a moisture-absorbent agent.

8. Switchgear according to claim 7, characterised in that the wall directly adjoins the external environment of the switchgear.

9. Switchgear according to claim 7, characterised in that the hole is an integral part of a weakened section that is blown out if too high a pressure builds up in the enveloping housing.

10. Switchgear according to claim 1 provided with a drive device, characterised in that the enveloping housing containing the air having a low moisture content also contains the drive device.

11. Distribution equipment made up of one or more adjoining singlephase or polyphase devices according to claim 1.

* * * * *